(12) United States Patent
Ito et al.

(10) Patent No.: US 7,847,049 B2
(45) Date of Patent: Dec. 7, 2010

(54) POLYROTAXANE AND PROCESS FOR PRODUCING THE SAME

(75) Inventors: Kohzo Ito, Tokyo (JP); Jun Araki, Tokyo (JP); Changming Zhao, Tokyo (JP)

(73) Assignee: The University of Tokyo, Tokyo (JP)

( * ) Notice: Subject to any disclaimer, the term of this patent is extended or adjusted under 35 U.S.C. 154(b) by 378 days.

(21) Appl. No.: 10/580,795

(22) PCT Filed: Nov. 24, 2004

(86) PCT No.: PCT/JP2004/017402

§ 371 (c)(1),
(2), (4) Date: Jun. 16, 2008

(87) PCT Pub. No.: WO2005/052026

PCT Pub. Date: Jun. 9, 2005

(65) Prior Publication Data

US 2009/0088546 A1 Apr. 2, 2009

(30) Foreign Application Priority Data

Nov. 28, 2003 (JP) ............................. 2003-398774

(51) Int. Cl.
*C08F 251/00* (2006.01)
(52) U.S. Cl. ..................................... 527/300
(58) Field of Classification Search ................. 527/300
See application file for complete search history.

(56) References Cited

U.S. PATENT DOCUMENTS

| | | | |
|---|---|---|---|
| 5,256,819 A | 10/1993 | Fried | |
| 6,037,387 A | 3/2000 | Yui | |
| 6,113,880 A | 9/2000 | Platzek | |
| 6,828,378 B2 | 12/2004 | Okumura | |

FOREIGN PATENT DOCUMENTS

| | | |
|---|---|---|
| CN | 1091439A A | 8/1994 |
| CN | 1426424 A | 6/2003 |
| EP | 1283218 A1 | 2/2003 |
| JP | 9-301893 A | 11/1997 |
| JP | 11-319069 A | 11/1999 |
| WO | 94/14745 A1 | 7/1994 |

OTHER PUBLICATIONS

Bulpitt, P., and D. Aeschlimann, "New Strategy for Chemical Modification of Hyaluronic Acid: Preparation of Functionalized Derivatives and Their Use in the Formation of Novel Biocompatible Hydrogels," Journal of Biomedical Materials Research 47(2):152-169, Aug. 13, 1999.

Fujita, H., et al., "Thermally Induced Localization of Cyclodextrins in a Polyrotaxane Consisting of β-Cyclodextrins and Poly(ethylene glycol)-Poly(propylene glycol) Triblock Copolymer," Macromolecules 32(8):2534-2541, Mar. 19, 1999.

Watanabe, J., et al., "Feasibility Study of Hydrolyzable Polyrotaxanes Aiming at Implantable Materials," Journal of Artificial Organs 3:136-142, 2000.

de Nooy, A.E.J., et al., "Selective Oxidation of Primary Alcohils Mediated by Nitroxyl Radical in Aqueous Solution. Kinetics and Mechanism.," Tetrahedron 51(29), pp. 8023-8032, 1995.

*Primary Examiner*—Ling-Siu Choi
*Assistant Examiner*—Sonya Wright
(74) *Attorney, Agent, or Firm*—Christensen O'Connor Johnson Kindness PLLC

(57) ABSTRACT

A process for producing a polyrotaxane in a high yield and at a satisfactory cost without using a large excess of a pseudopolyrotaxane and/or without using a large excess of an activated reagent. The process for polyrotaxane production comprises: an inclusion step in which a carboxylated polyethylene glycol which is a polyethylene glycol carboxylated at each end is mixed with cyclodextrin molecules to obtain a pseudopolyrotaxane which comprises cyclodextrin molecules which include the carboxylated polyethylene glycol in their cavities as if the cyclodextrin molecules are spitted with the carboxylated polyethylene glycol; and a capping step in which the pseudopolyrotaxane is reacted with capping groups having —$NH_2$ or —OH to obtain a polyrotaxane terminated at each end by a —CO—NH-(capping group) or —CO—O-(capping group).

2 Claims, No Drawings

US 7,847,049 B2

POLYROTAXANE AND PROCESS FOR PRODUCING THE SAME

TECHNICAL FIELD

The present invention relates to a polyrotaxane and a method for producing the polyrotaxane. In particular, the present invention relates to a polyrotaxane having at each end a structure obtained by the reaction between a carboxyl group and a capping group having a group that reacts with a carboxyl group, such as —CO—NH— and —CO—O—, and a method for producing the polyrotaxane.

BACKGROUND ART

Polyrotaxane is comprised of pseudopolyrotaxane, which comprises a linear molecule (axis) and cyclic molecules (rota) in which the linear molecule is included in the cavities of cyclic molecules in a skewered manner, and capping groups, each of which locates at each end of the pseudopolyrotaxane (each end of the linear molecule) in order to prevent the dissociation of the cyclic molecules. For example, a polyrotaxane having α-cyclodextrin (hereinafter cyclodextrin may be simply abbreviated as "CD") as cyclic molecules, and polyethylene glycol (hereinafter may be abbreviated as "PEG") as a linear molecule has been intensively studied in recent years for its various characteristics.

Polyrotaxane is usually prepared as follows: the —OH group at each end of PEG is substituted by a —NH$_2$ group to obtain H$_2$N-PEG-NH$_2$ having at each end a —NH$_2$ group, the H$_2$N-PEG-NH$_2$ is mixed with α-CD(s) to obtain pseudopolyrotaxane included in α-CD(s), and then the pseudopolyrotaxane is reacted with a capping group having a —COOH group (Bl-COOH), such as adamantane acetic acid, to obtain polyrotaxane in which each end of the PEG site of the pseudopolyrotaxane is capped by a —NH—CO—O-Bl group (see Patent Document 1).

The amidation between a —NH$_2$ group and a —COOH group is commonly conducted by nucleophilically attacking of the unshared electron pair of amine onto the positively charged carbonyl carbon of an activated carboxyl group. In such an instance, a large excess of amine is often added to the activated carbonyl (see Non-Patent Document 1).

H$_2$N-PEG-NH$_2$ having at each end a —NH$_2$ group is commercially available, but the variation is poor with regard to the molecular weight of PEG, in particular, those having a higher molecular weight PEG are insufficient. Therefore, the —OH group at each end of PEG was modified with N,N'-carbonyldiimidazole and ethylenediamine to prepare H$_2$N-PEG-NH$_2$ having various PEG molecular weights, in particular, those having higher PEG molecular weights (see Patent Document 1 and Non-Patent Document 2). They are used in a manner similar to the above-described manner to prepare a polyrotaxane having various molecular weights.

Patent Document 1: WO 01/83566.

Non-Patent Document 1: P. Bulpitt, D. Aeschlimann, J. Biomed. Mater. Res., 47 (1999), 152-169.

Non-Patent Document 2: H. Fujita, T. Ooya, N. Yui, Macromolecules 32 (1999), 2534-2541.

DISCLOSURE OF INVENTION

Problems to be Solved by the Invention

However, in the amidation, more specifically in the reaction between H$_2$N-PEG-NH$_2$ included in CD(s) and a capping group having a —COOH group, the use of a large excess of amine, more specifically a large excess of H$_2$N-PEG-NH$_2$ is not preferable from the viewpoint of yield and cost. To conduct the reaction more effectively, a large excess of carboxyl groups, more specifically a large excess of capping groups having a —COOH group may be used, but in this instance a large amount of an activated reagent such as BOP reagent (benzotriazole-1-yl-oxy-tris(dimethylamino)phosphonium hexafluorophosphate) and/or HOBt reagent (1-hydroxy-1H-benzotriazole monohydrate) is necessary, which is not preferable from the viewpoint of cost.

When H$_2$N-PEG-NH$_2$ having at each end a —NH$_2$ group is used, the capping group is limited to substances that react with amine, such as those having a —COOH group. Accordingly, more cost may be incurred due to the limited choice of the capping group or the preparation of desired capping groups.

Moreover, although H$_2$N-PEG-NH$_2$ having various molecular weights and having at each end a —NH$_2$ group can be obtained by the methods described in Patent Document 1 and Non-Patent Document 2, the ends of the resulting compounds should have the structure of —O—(CH$_2$)$_2$—O—CO—NH—(CH$_2$)$_2$—NH$_2$. Therefore, the presence of an urethane linkage or a carbamate linkage (—O—CO—NH—) and an amide linkage between the PEG moiety and the capping group may chemically destabilize the molecule.

Thus, an object of the present invention is to solve the problems of the related art.

More specifically, an object of the present invention is to provide a method for producing a polyrotaxane in a high yield and at a satisfactory cost without using a large excess of pseudopolyrotaxane and/or without using a large excess of an activated reagent.

In addition to, or other than the above-described object, an object of the present invention is to provide a polyrotaxane having a desired capping group and a method for producing the polyrotaxane that solve the problem of the related art, more specifically widen the choice of the capping groups.

Moreover, in addition to, or other than the above-described objects, an object of the present invention is to provide a polyrotaxane including PEG with a wide variety of molecular weight and having a chemically stable linkage, and a method for producing the polyrotaxane.

More specifically, an object of the present invention is to provide a polyrotaxane having a structure, e.g., a —CO—NH-Bl terminal or a —CO—O-Bl terminal, obtained by the reaction between a —COOH group at the PEG side and a group, e.g., a —NH$_2$ group or a —OH group, that reacts with the —COOH group, at the capping group side, in place of the conventional polyrotaxanes obtained by the reaction between a —COOH group at the capping group side and a —NH$_2$ group at the PEG side, and to provide a method for producing the polyrotaxane.

Means for Solving the Problem

The present inventors have found that the above-described objects can be achieved by the following inventions:

<1> A Method for Producing a Polyrotaxane Comprising:

an inclusion step in which carboxylated polyethylene glycol having a carboxyl group at each end and cyclodextrin molecules are mixed together, to obtain a pseudopolyrotaxane in which the carboxylated polyethylene glycol is included in the cavity of each of cyclodextrin molecules in a skewered manner; and a capping step in which capping groups each having a group that reacts with a carboxyl group are reacted with the pseudopolyrotaxane, to obtain a polyrotaxane having at each end a capping group.

<2> In the above item <1>, the capping group having a group that reacts with a carboxyl group may be a capping group having a —$NH_2$ group or a capping group having a —OH group, and the polyrotaxane has at each end a —CO—NH— (capping group) structure or a —CO—O-(capping group) structure.

<3> A Method for Producing a Polyrotaxane Comprising:

an inclusion step in which carboxylated polyethylene glycol having a carboxyl group at each end and cyclodextrin molecules are mixed, to obtain pseudopolyrotaxane in which the carboxylated polyethylene glycol is included in the cavity of each of cyclodextrin molecules in a skewered manner; and a capping step in which the pseudopolyrotaxane is reacted with capping groups each having a —$NH_2$ group or a —OH group, to obtain a polyrotaxane having at each end —CO—NH-(capping group) or —CO—O-(capping group).

<4> In any one of the above items <1> to <3>, the carboxylated polyethylene glycol is prepared by the oxidation of polyethylene glycol with 2,2,6,6-tetramethyl-1-piperidinyl oxyradical (TEMPO).

<5> A polyrotaxane comprising a carboxylated polyethylene glycol included in the cavity of each of cyclodextrin molecules in a skewered manner, wherein the carboxylated polyethylene glycol has at each end a capping group to prevent the dissociation of the cyclodextrin molecules, the each end of the carboxylated polyethylene glycol has a structure obtained by the reaction between a carboxyl group and a capping group having a group that reacts with a carboxyl group.

<6> In the above item <5>, the capping group having a group that reacts with a carboxyl group may be a capping group having a —$NH_2$ group or a capping group having a —OH group, and each of the structures obtained thereby may represent —CO—NH-(capping group) or —CO—O-(capping group), respectively.

<7> A polyrotaxane comprising a carboxylated polyethylene glycol included in the cavity of each of cyclodextrin molecules in a skewered manner, wherein the carboxylated polyethylene glycol has at each end a capping group to prevent the dissociation of the cyclodextrin molecules, and the capping group at each end has a structure of a —CO—NH-Bl group or a —CO—O-Bl group.

<8> A Method for Producing a Pseudopolyrotaxane Comprising:

a carboxylation step in which polyethylene glycol is oxidized with 2,2,6,6-tetramethyl-1-piperidinyl oxyradical (TEMPO), to obtain carboxylated polyethylene glycol having a carboxyl group at each end; and an inclusion step in which the carboxylated polyethylene glycol and cyclodextrin molecules are mixed together, to obtain a pseudopolyrotaxane comprising the carboxylated polyethylene glycol included in the cavity of each of the cyclodextrin molecules in a skewered manner.

<9> A pseudopolyrotaxane comprising a carboxylated polyethylene glycol included in the cavity of each of cyclodextrin molecules in a skewered manner, wherein the carboxylated polyethylene glycol has at each end a COOH group.

<10> A method for producing carboxylated polyethylene glycol by oxidizing polyethylene glycol with 2,2,6,6-tetramethyl-1-piperidinyl oxyradical (TEMPO), to obtain the carboxylated polyethylene glycol having a carboxyl group at each end.

EFFECTS OF THE INVENTION

The present invention can provide a method for producing a polyrotaxane in a high yield and at a satisfactory cost without using a large excess of pseudopolyrotaxane and/or without using a large excess of an activated reagent.

In addition to, or other than the above-described effect, the present invention can provide a polyrotaxane having desired capping groups and a method for producing the polyrotaxane that solve the problem of the related art, more specifically widen the choice of the capping groups.

Moreover, in addition to, or other than the above-described effects, the present invention can provide a polyrotaxane including PEG with a wide variety of molecular weight and having a chemically stable linkage, and a method for producing the polyrotaxane.

More specifically, the present invention can provide a polyrotaxane having a structure, e.g., a —CO—NH-Bl terminal or a —CO—O-Bl terminal, obtained by the reaction between a —COOH group at the PEG side and a group, e.g., a —$NH_2$ group or a —OH group, that reacts with the —COOH group, at the capping group side, in place of the conventional polyrotaxanes obtained by the reaction between a —COOH group at the capping group side and a —$NH_2$ group at the PEG side, and can provide a method for producing the above-described polyrotaxane.

BEST MODE FOR CARRYING OUT THE INVENTION

The present invention will be described in detail, hereinafter.

The present invention provide a method for producing a polyrotaxane comprising: an inclusion step in which carboxylated polyethylene glycol having at each end a carboxyl group is mixed with cyclodextrin molecules to obtain a pseudopolyrotaxane in which a carboxylated polyethylene glycol is included in the cavities of the cyclodextrin molecules in a skewered manner; and a capping step in which the pseudopolyrotaxane is reacted with capping groups having a carboxyl group to obtain a polyrotaxane terminated at each end by a capping group represented by —CO—NH-(capping group) or —CO—O-(capping group). Preferably, the capping group having a group that reacts with a carboxyl group may be a capping group having a —$NH_2$ group or a —OH group to obtain a polyrotaxane molecule having —CO—NH-(capping group) or a —CO—O-(capping group).

At first, the method according to the present invention is initiated by the inclusion step in which carboxylated polyethylene glycol having at each end a carboxyl group is mixed with cyclodextrin molecules to obtain a pseudopolyrotaxane comprising a carboxylated polyethylene glycol included in the cavities of the cyclodextrin molecules in a skewered manner.

The polyethylene glycol (PEG) used in the present invention is not limited with respect to the molecular weight, and may be PEG having a high molecular weight.

Carboxylated PEG, i.e., PEG having at each end a carboxyl group (—COOH), may be those obtained by a conventionally known method such as oxidation with potassium permanganate, oxidation with manganese oxide/hydrogen peroxide, succinic anhydride addition, or so-called carboxymethylation in which alkaline hydrolysis is conducted after binding ethyl bromoacetate.

In particular, the carboxylated PEG is preferably prepared by oxidizing PEG with 2,2,6,6-tetramethyl-1-piperidinyl oxyradical (TEMPO).

Oxidation with TEMPO can be conducted in a weakly basic system in which sodium bromide and sodium hypochlorite are mixed in water, a two-phase system of water and an organic solvent (for example, methylene chloride, chloroform, and acetonitrile) or a system in which sodium acid carbonate, potassium bromide or other compounds are mixed in a mixed solvent. In addition, the oxidation can be conducted under atmospheric pressure and at a temperature of between 0° C. and room temperature. More preferably, the oxidation with TEMPO may be conducted in a system in which sodium bromide and sodium hypochlorite are mixed in water at a constant pH of 10 to 11, a temperature of 0° C. to room temperature, and under atmospheric pressure.

The oxidation with TEMPO is, different from the conventional preparation method of carboxylated PEG, preferable in that carboxylation is completed within one step, and that the degree of modification is increased.

Cyclodextrin (CD) to be mixed with carboxylated PEG may be selected from various CDs. Examples thereof may include α-CD, β-CD and γ-CD, preferably α-CD.

Carboxylated PEG and CD may be mixed by adding them in a solvent, and allowing the solution to stand at a temperature near room temperature and under atmospheric pressure for several hours to overnight. The solvent is not specifically limited as long as it can dissolve carboxylated PEG and CD. Examples thereof may include water, DMSO and DMF.

The pseudopolyrotaxane obtained by the inclusion step is then subjected to the capping step in which the pseudopolyrotaxane molecule is reacted with capping groups having a —$NH_2$ group or a —OH group to obtain a polyrotaxane having at each end —CO—NH-(capping group) or —CO—O-(capping group).

The capping group is not specifically limited as long as it has a group that reacts with a carboxyl group, such as a —$NH_2$ group or a —OH group, and prevents the dissociation of the CD molecules from the resulting polyrotaxane in the skewered state. Preferably, the group to be reacted with a carboxylic group may be, but not limited to, a —$NH_2$ group or a —OH group. Examples of the capping groups that react with a carboxyl group may include, but are not limited to, dinitrophenyl groups, adamantane groups, anthracene groups, trityl groups, cyclodextrins, fluoresceins and pyrenes, and derivative groups thereof.

The conditions for the capping step can be selected in accordance with the group of the capping group that reacts with a carboxyl group. For example, when a —$NH_2$ group or a —OH group is used as the group reacted with a carboxyl group, conventionally known conditions for amidation or esterification can be used. In the present invention, it is preferable to place a pseudopolyrotaxane at the carboxyl group side that cause an amidation, and a capping group at the amino group side. Thus, it need not use a large excess of pseudopolyrotaxane and a large excess of activated reagents that are usually used in common amidations, such as BOP reagent and/or HOBt reagent.

According to the above-mentioned method, the present invention can provide a polyrotaxane in which a carboxylated polyethylene glycol is included in the cavities of cyclodextrin molecules in a skewered manner and the carboxylated polyethylene glycol have at each end a capping group to prevent the dissociation of the cyclodextrin molecules, and the each end has a structure obtained by the reaction between a carboxyl group and a capping group having a group that reacts with a carboxyl group. Preferably, the capping group having a group that reacts with a carboxyl group may be a capping group having a —$NH_2$ group or a —OH group, in which instance the resulting polyrotaxane has at each end a —CO—NH-Bl group or a —CO—O-Bl group.

Here, the cyclodextrin molecules, carboxylated PEG and capping group are as described above. "Bl" of the "—CO—NH-Bl group" or "—CO—O-Bl group" refers to the site on the capping group having a —$NH_2$ group or a —OH group excluding the —$NH_2$ group or the —OH group.

The present invention also provides a pseudopolyrotaxane, which is the intermediate of polyrotaxane, and provides a method for producing the pseudopolyrotaxane.

More specifically, the pseudopolyrotaxane of the present invention is characterized in that a carboxylated polyethylene-glycol is included in the cavities of cyclodextrin molecules in a skewered manner, and the carboxylated polyethylene glycol have at each end a COOH group.

The method for producing the pseudopolyrotaxane of the present invention comprises an inclusion step in which carboxylated polyethylene glycol is mixed with cyclodextrin molecules to obtain the pseudopolyrotaxane in which the carboxylated polyethylene glycol is included in the cavities of cyclodextrin molecules in a skewered manner. In particular, the method according to the present invention may comprises an oxidation step of polyethylene glycol with 2,2,6,6-tetramethyl-1-piperidinyl oxyradical (TEMPO), to obtain carboxylated polyethylene glycol having at each end a carboxyl group.

The present invention also provides a method for producing carboxylated polyethylene glycol, which is the major component of pseudopolyrotaxane, the intermediate of polyrotaxane. More specifically, the carboxylated polyethylene glycol of the present invention is prepared by oxidizing polyethylene glycol with 2,2,6,6-tetramethyl-1-piperidinyl oxyradical (TEMPO) to place a carboxyl group at each end thereof. The conditions and the like of the method are as described above.

The present invention is further illustrated by, but is not limited to, the following Examples.

EXAMPLE 1

Preparation of PEG-Carboxylic Acid by the Oxidation of PEG with TEMPO 10 g of PEG (molecular weight: 20,000 or 35,000), 100 mg of TEMPO (2,2,6,6-tetramethyl-1-piperidinyl oxyradical) and 1 g of sodium bromide were dissolved in 100 ml of water. To the resulting solution, 5 ml of a commercially available aqueous solution of sodium hypochlorite (effective chlorine concentration: approx. 5%) was added, and allowed to react with stirring at room temperature. Immediately after the addition, the pH of the system abruptly decreased with the progress of the reaction, but the pH was maintained in a range of 10 to 11 as much as possible by adding 1N NaOH. The decrease in the pH stopped in about 3 minutes, but stirring was continued for additional 10 minutes. Ethanol was added in an amount up to 5 ml to terminate the reaction. The solution was extracted with three 50 ml portions of methylene chloride to extract components other than inorganic salts, and evaporated on an evaporator to remove methylene chloride. The resulting substance was dissolved in 250 ml of warm ethanol, and allowed to stand in a freezer at −4° C. overnight to deposit PEG-carboxylic acid alone. The deposited PEG-carboxylic acid was collected by centrifugation. The cycle of dissolution in warm ethanol, deposition, and centrifugation was repeated several times, and the resulting substance was dried in vacuo to obtain PEG-carboxylic acid. The yield was 95% or higher, and the degree of carboxylation was 95% or higher.

<Preparation of an Inclusion Complex Using PEG-Carboxylic Acid and α-CD>

Each of 3 g of the PEG-carboxylic acid prepared above and 12 g of α-CD was separately dissolved in 50 ml of warm water at 70° C., and then these resulting solutions were mixed together, and allowed to stand in a refrigerator (4° C.) overnight. An inclusion complex deposited in a paste form was freeze-dried and collected. The yield was 90% or higher (the yield was about 14 g).

<Capping of Inclusion Complex in a Reaction System Containing Adamantane Amine and BOP Reagent>

0.13 g of adamantane amine was dissolved in 50 ml of dimethylformamide (DMF) at room temperature, and the solution was added to 14 g of the resulting inclusion complex prepared above, and then immediately shaken well. Then, to the resulting solution, a solution of 0.38 g of BOP reagent (benzotriazole-1-yl-oxy-tris(dimethylamino)phosphonium hexafluorophosphate) in 25 ml of DMF was added and thoroughly shaken in the similar manner. Subsequently, to the resulting solution, a solution of 0.14 ml of diisopropylethylamine in 25 ml of DMF was added, and thoroughly shaken in the similar manner. The resulting mixture was allowed to stand in a refrigerator overnight. Then, 100 ml of a mixed solution of DMF and methanol (1:1) was added and mixed well, and the mixture was centrifuged to remove the supernatant. The washing process using the DMF/methanol mixed solution was repeated twice, and further washing process using 100 ml portions of methanol was repeated twice by the similar centrifugation. The resulting precipitate was dried in vacuo and dissolved in 50 ml of dimethyl sulfoxide (DMSO). The resulting transparent solution was added dropwise to 700 ml of water to deposit a polyrotaxane. The deposited polyrotaxane was collected by centrifugation, and dried in vacuo or freeze-dried. The cycle of dissolution in DMSO, deposition in water, collection and drying was repeated twice, finally to obtain a purified polyrotaxane. The yield on the basis of the added inclusion complex was about 68% (the yield from 14 g of the inclusion complex was 9.6 g on the basis of a PEG having a molecular weight of 35,000).

EXAMPLE 2

<Capping of Inclusion Complex in a Reaction System Containing Adamantaneacetic Acid and BOP Reagent>

3 g of BOP reagent, 1 g of HOBt, 3.0 g of cyclodextrin and 1.25 ml of diisopropylethylamine were dissolved in 50 ml of DMF in this order at room temperature. To the solution, 14 g of the inclusion complex prepared as described in Example 1 was added, and immediately shaken well. The resulting slurry sample was allowed to stand in a refrigerator overnight. After that, 50 ml of a mixed solution of DMF and methanol (1:1) was added, mixed well and centrifuged to remove the supernatant.

The washing process using the DMF/methanol mixed solution was repeated twice, and another washing process using 100 ml portions of methanol was repeated twice by the similar centrifugation. The resulting precipitate was dried in vacuo and dissolved in 50 ml of DMSO. The resulting transparent solution was added dropwise to 700 ml of water to deposit polyrotaxane. The deposited polyrotaxane was collected by centrifugation, and dried in vacuo or freeze-dried. The cycle of dissolution in DMSO, deposition in water, collection and drying was repeated twice, finally to obtain a purified polyrotaxane. The yield on the basis of the added inclusion complex was about 57% (the yield from 14 g of the inclusion complex was 8.0 g on the basis of a PEG having a molecular weight of 35,000).

What is claimed that:

1. A method for producing a polyrotaxane comprising:
   an inclusion step in which carboxylated polyethylene glycol having a carboxyl group at each end and cyclodextrin molecules are mixed together, to obtain a pseudopolyrotaxane in which the carboxylated polyethylene glycol is included in the cavities of cyclodextrin molecules in a skewered manner; and
   a capping step in which capping groups each having a group that reacts with a carboxyl group are reacted with the pseudopolyrotaxane, to obtain a polyrotaxane having at each end a capping group,
   wherein the carboxylated polyethylene glycol is prepared by oxidation of polyethylene glycol with 2,2,6,6-tetramethyl-1-piperidinyl oxyradical (TEMPO); and
   the oxidation with TEMPO is conducted in a weakly basic system which is a mixed solution of sodium bromide and sodium hypochlorite in water.

2. A method for producing a polyrotaxane comprising:
   an inclusion step in which carboxylated polyethylene glycol having a carboxyl group at each end and cyclodextrin molecules are mixed, to obtain pseudopolyrotaxane in which the carboxylated polyethylene glycol is included in the cavities of cyclodextrin molecules in a skewered manner; and
   a capping step in which the pseudopolyrotaxane is reacted with capping groups each having a —NH$_2$ group or a —OH group, to obtain a polyrotaxane having at each end —CO—NH-(capping group) or —CO—O-(capping group),
   wherein the carboxylated polyethylene glycol is prepared by oxidation of polyethylene glycol with 2,2,6,6-tetramethyl-1-piperidinyl oxyradical (TEMPO); and
   the oxidation with TEMPO is conducted in a weakly basic system which is a mixed solution of sodium bromide and sodium hypochlorite in water.

* * * * *